United States Patent [19]
Hoover et al.

[11] Patent Number: 5,650,454
[45] Date of Patent: Jul. 22, 1997

[54] RUBBER ADDITIVE AND RUBBER COMPOUNDS

[75] Inventors: James W. Hoover, Akron; Maurice E. Wheeler, Ashtabula, both of Ohio; James V. Fusco, Red Bank, N.J.; Harvey L. Kaufman, Hudson, Ohio

[73] Assignee: Flow Polymers, Inc., Cleveland, Ohio

[21] Appl. No.: 518,236

[22] Filed: Aug. 23, 1995

[51] Int. Cl.$^6$ ................. C08L 3/00; C10C 3/00
[52] U.S. Cl. ................. 524/47; 524/64; 208/22; 106/DIG. 7
[58] Field of Search .............. 524/47, 64; 527/300, 527/500; 208/22; 106/DIG. 7

[56] References Cited

U.S. PATENT DOCUMENTS

| | | |
|---|---|---|
| 3,617,377 | 11/1971 | Funabashi-shi et al. . |
| 3,892,700 | 7/1975 | Burke, Jr. ................. 524/47 |
| 4,005,040 | 1/1977 | Maher . |
| 4,008,095 | 2/1977 | Fukushima et al. . |
| 4,079,025 | 3/1978 | Young et al. . |
| 4,133,932 | 1/1979 | Peck ................. 428/323 |
| 4,327,002 | 4/1982 | Feldman . |
| 4,505,847 | 3/1985 | Jackson . |
| 4,639,487 | 1/1987 | Hazelton et al. . |
| 4,845,145 | 7/1989 | Hazelton et al. . |
| 4,851,468 | 7/1989 | Hazelton et al. . |
| 5,009,648 | 4/1991 | Aronoff et al. . |
| 5,019,610 | 5/1991 | Sitz et al. . |
| 5,021,476 | 6/1991 | Pinomaa . |
| 5,128,392 | 7/1992 | DeTrano et al. . |

OTHER PUBLICATIONS

The Vanderbilt Rubber Handbook, 13th Ed., Robert F. Ohm, Editor, (R.T. Vanderbilt Company, Inc., Norwalk, CT, 1990) pp. 387–389.

Rubber World Magazine's 1991 Blue Book, Don R. Smith, Ed., (Lippincott & Peto Inc., Akron, OH, 1991) pp. 72–73.

*Primary Examiner*—Nathan M. Nutter
*Attorney, Agent, or Firm*—Pearne, Gordon, McCoy & Granger LLP

[57] ABSTRACT

A rubber additive is provided, which comprises crosslinked fatty acid and starch, and preferably further comprises a carrier, preferably an asphalt carrier. The rubber additive increases tear resistance when added to a rubber compound.

20 Claims, No Drawings

RUBBER ADDITIVE AND RUBBER COMPOUNDS

BACKGROUND OF THE INVENTION

The present invention relates generally to rubber additives and more particularly to rubber additives which improve tear resistance and other properties when added to rubbers such as general purpose and specialty rubbers, particularly the rubber used in tire components and applications.

DESCRIPTION OF RELATED ART

Improving tear resistance in rubber compounds is a frequent goal of rubber compounding. It is known that the addition of silica, fine clay, and reinforcing grades of carbon black to rubber formulations in controlled amounts can increase tear resistance. However, higher filler concentrations can result in loss of energy dissipation which contributes to low tear resistance properties. A decreased state-of-cure will increase tear resistance but at a cost of degrading other important physical properties such as increased hysteresis and permanent set. Increased filler dispersion tends to increase tear resistance but is often difficult to achieve economically and may sacrifice other physical properties if mixing is excessive. There is a need for a rubber additive which is effective in increasing tear resistance in rubber compounds and which avoids the problems of the prior art.

SUMMARY OF THE INVENTION

A rubber additive is provided, which comprises crosslinked fatty acid and starch, and preferably further comprises a carrier. The carrier is preferably an asphalt carrier or a silica carrier. A rubber compound including the rubber additive and having increased tear resistance is also provided.

DETAILED DESCRIPTION OF THE PREFERRED EMBODIMENTS OF THE INVENTION

Percentages are weight percent unless otherwise specified or indicated. Parts are parts by weight.

The fatty acid to be used is preferably vegetable oil fatty acid, preferably soya fatty acid, less preferably the fatty acid from rapeseed oil and linseed oil. The preferred fatty acid is soya fatty acid available from the Humko Chemical Division of Witco Corp., Memphis, Tenn., as Industrene 226. Industrene 226 has a titer of 26° C. maximum, an iodine value of 125–135, an acid value of 195–203, a saponification value of 195–204, a 2% maximum unsaponifiable matter, and a typical composition of 12% palmitic acid, 4.5% stearic acid, 23.5% oleic acid, 54% linoleic acid, and 6% linolenic acid. Less preferred soya fatty acids (fatty acids derived from soybean oil) are Industrene 126, 130, 224, and 225, which contain 7–18% palmitic acid, 2.5–9% stearic acid, 23–33% oleic acid, 33–56% linoleic acid, and 5–20% linolenic acid.

The fatty acid is crosslinked, preferably using peroxide, (although other crosslinking methods may be used) preferably organic peroxide, more preferably a high temperature decomposition peroxide—one which has a decomposition or crosslinking temperature above 240° F., preferably one which has a 1 hour half life temperature between 240° F. and 300° F. A preferred peroxide is DI-CUP 40C, which is, on a weight percent basis, 38.8% dicumyl peroxide, supported on precipitated calcium carbonate (60 weight %), with 1.2% cumene. It has active oxygen of about 5.9% and a 1 hour half life temperature of 275° F. It is available from Hercules Incorporated, Wilmington, Del. 19894. An alternative peroxide is Luperco 231-XL, from Atochem North America, Inc., Buffalo, N.Y. 14240, which is 1,1-di(t-butylperoxy)-3, 3,5-trimethylcyclohexane, which is about 40% peroxide, 60% filler or diluent, having an active oxygen of about 4.2% and a recommended cure temperature of 280°–360° F.

Preferably a coagent is used with the peroxide to help stabilize the crosslinking reaction among the fatty acid molecules. Coagents generally speed up the reaction and increase the crosslink density. A preferred coagent is trimethylolpropane trimethacrylate, available from Sartomer Company, Inc., Exton, Pa. 19341, as SR350. Alternative coagents include ethylene dimethacrylate, triethylene glycol dimethacrylate, ethylene glycol dimethacrylate, tetraethylene glycol dimethacrylate, polyethylene glycol(200) dimethacrylate, diethylene glycol dimethacrylate, 1,3-butylene glycol dimethacrylate, and any crosslinking monomer that increases the reaction rate, such as Saret 500, 515, 516, 517, and 518 from Sartomer Company, Inc. Other suitable coagents are known in the art, such as triallylcyanurates. Coagents are preferably added at a rate of 0.2 to 2, more preferably 0.5 to 1, parts per 1 part peroxide (100% peroxide basis). A sufficient amount of peroxide and optionally coagent is used to effectively crosslink the fatty acid.

The starch to be used is preferably corn starch, preferably unmodified corn starch, such as is available from Grain Processing Corp., Muscatine, Iowa 52761, as Product B20F. The corn starch preferably has a bulk density of about 28 lbs/ft$^3$ loose and about 35 lbs/ft$^3$ packed, preferably is a fine powder with about 85% passing through a 200 mesh screen (U.S. Standard Sieve No. 200) and about 45% passing through a 325 mesh screen (U.S. Standard Sieve No. 325), and has a moisture content, by weight, of about 11–12% and a pH of 6.

The rubber additive may be used without a carrier, although a carrier is preferably included. The carrier is mixable, preferably miscible, with the rubber composition or compound to which the rubber additive is being added, and assists in carrying the rubber additive into the rubber composition and dispersing it therein. Tests have indicated that the rubber additive works better if a carrier is included; the carrier assists in more fully dispersing the rest of the additive into the rubber composition. The carrier is preferably talc, other known partitioning agents, calcium carbonate, clay, metallic stearate, or a polymer carrier such as petroleum-based waxes and resins, more preferably a silica carrier, more preferably an asphalt carrier or other hydrocarbon carrier. The silica carrier is preferably hydrated amorphous silica powder, available as Hi-Sil ABS from PPG Industries, Inc., although other silica powders can be used. The asphalt carrier is asphalt-based and preferably at least 50 weight percent asphalt. The asphalt carrier is preferably asphalt or, more preferably, asphalt with the addition of an amount of resin effective to make the composition pelletizable or flakeable and preferably with antiblocking characteristics. The asphalt carrier is preferably at least 90, preferably 90–99, more preferably 94–98, more preferably about 95, weight percent asphalt (which may be monor, oxidized asphalt (blown), gilsonite, or other types of asphalt) and preferably at least 1, preferably 1–10, more preferably 2–6, more preferably about 5, weight percent resin. The preferred resins in this regard are styrene copolymers and ethylene copolymers, preferably styrenic block copolymers (such as styrene-butadiene-styrene) and ethylene-vinyl acetate (EVA). The carrier, particularly the asphalt carrier, preferably has a ring and ball softening point of about 100°–400° F., more preferably about 175°–250° F., more preferably about 194°–240° F., more preferably about 220°–235° F. Preferred asphalt carriers are identified in the following Examples 1–12. In these Examples, A through H are ingredients and the percents are weight percent. Softening point is ring and ball softening point; needle penetration is at 77° F., 100 gms., 5 sec.; melt index is ASTM D-1238, Condition E. A is asphalt (synonyms: monor; petroleum bitumen) having a softening point of 170°–180° F. and a needle penetration of 0.5–1.0, available from Sun Company, Inc. in Philadelphia, Pa. B is asphalt (called asphalt AC-20 by many companies), an asphalt having a softening point of 111°–125° F. and a needle penetration of 45–70, available as Asphalt A from Koch Materials Company, Heath, Ohio. C is gilsonite, also known as uintaite, a natural thermoplastic hydrocarbon resin or high softening point asphalt, having a softening point of 300°–330° F. and a needle penetration of 0, available from Ziegler Chemical & Mineral Corp., Jericho, N.Y. D is oxidized asphalt (blown) having a softening point of 220°–230° F. and a needle penetration of 0–5, available as Product MR-225 from Koch Materials Company. E is oxidized asphalt (blown) having a softening point of 300°–315° F. and a needle penetration of 0–2, available as Product MR-305 from Koch Materials Company. F is ethylene-vinyl acetate copolymer having a Shore A hardness of 76–88 and a melt index of 2–30, preferably 20–30, available as Product AT-2820 or AT-1941 from AT Plastics, Inc., Brampton, Ontario. G is styrene-butadiene-styrene block copolymer having a Shore A hardness of 70–75 and a melt index of 0.1–1.0, available as KratoD1101 thermoplastic rubber from Shell Oil Co., Houston, Tex. H is air-blown, cross-linked asphalt or oxidized asphalt (blown), having a softening point of 239°–257° F. and a needle penetration (at 115° F.) of 15–20, available as Product Flow-92 from Koch Materials Company.

Examples 1–12 are preferably prepared by heating the lower softening point asphalt (A and/or B) to 335°–365° F., adding the synthetic resin (F and/or G) in pellet or granular form, and mixing in the remaining ingredients, a temperature of about 335°–365° F. being maintained throughout. Example 1 is A-70%, D-25%, and G-5% and has a softening point of 201° F. Example 2 is A-80%, C-15%, and F-5% and has a softening point of 217° F. Example 3 is B-93% and G-7% and has a softening point of 199° F. Example 4 is A-90%, E-8%, and G-2% and has a softening point of 194° F. Example 5 is A-60%, D-35%, and F-5% and has a softening point of 212° F. Example 6 is A-60%, D-18%, E-17%, F-2.5%, and G-2.5% and has a softening point of 221° F. Example 7 is A-60%, C-10%, D-25%, F-2.5%, and G-2.5% and has a softening point of 212° F. Example 8 is C-20%, B-75%, and F-5% and has a softening point of 235° F. Example 9 is A-50%, B-35%, C-10%, F-2%, and G-3% and has a softening point of 221° F. Example 10 is A-70%, D-15%, E-10%, and F-5% and has a softening point of 223° F. Example 11 is A-78%, C-16%, F-3%, and G-3% and has a softening point of 212° F. Example 12 is A-38.1%, F-4.2%, and H-57.7% and has a softening point of 228° F. Example 12 is the preferred asphalt carrier.

The rubber additive preferably has about 1–3, more preferably about 2, parts starch per 1 part fatty acid and about 6–12 parts asphalt carrier per 1 part fatty acid. Per 10 parts fatty acid and starch combined or calculated or added together, the rubber additive preferably has about 20–50, more preferably about 30, parts carrier if the carrier is an asphalt carrier, and preferably about 1–3, more preferably about 2, parts carrier if the carrier is silica, talc, calcium carbonate, clay, metal stearate or other powder carrier. If the carrier is silica or other powder, the carrier may optionally contain about 1–10, more preferably about 5, parts wax and/or about 1–10, more preferably about 5, parts stearic acid per 17 parts silica or other powder, in order to aid dispersion into the rubber composition.

The asphalt carrier is dark colored and causes the rubber additive to be dark colored and is useful in dark colored or black rubber compositions. The silica carrier, and other of the powder carriers, are white, causing the rubber additive to be white, and are useful in light colored or white rubber compositions, such as the whitewall of whitewall tires.

A preferred rubber additive for a non-white compound has the following composition: 1) fatty acid—about 6–10 parts, preferably about 7–9 parts, more preferably about 8 parts; 2) organic peroxide—about 0.02–0.5 parts, more preferably about 0.05–0.2 parts, more preferably about 0.1 parts undiluted and unfilled organic peroxide; 3) coagent—about 0.02–0.5 parts, more preferably about 0.05–0.2 parts, more preferably about 0.1 parts; 4) starch—about 10–22 parts, more preferably about 13–19 parts, more preferably about 16.5 parts; and 5) asphalt carrier—about 50–100 parts, more preferably about 65–85 parts, more preferably about 75 parts.

The rubber additive is preferably made as follows. The fatty acid, preferably soya fatty acid, after being stirred is measured for viscosity with a #2 Zahn Signature Series 90 Viscosity Cup with the sample and ambient temperatures being 74°–78° F. Preferably the sample takes 11–16 seconds to run out of the cup (referred to as 11–16 points), more preferably 12–15 seconds (or points). The fatty acid is placed in a reactor vessel which is set at about 320°–360° F. (this temperature being maintained throughout) and mixed 3–5 minutes. The peroxide, to cause crosslinking of the fatty acid, is slowly added and mixed for 3 minutes. The coagent is added and mixed for 2 hours, with the viscosity of the mixture being tested every ½ hour. The viscosity is tested as described above, with the target viscosity being 15–20 points higher than the original viscosity. For example, if the initial viscosity is 15 points, the target viscosity is 30–35 points. The ending viscosity is preferably 27–35, more preferably 29–33, points. Preferably when 75% of the viscosity change has occurred, an infrared (IR) scan is taken, with a KBr pellet, medium film thickness, baseline at 800, no solvent, scan time 3 minutes. Preferably peaks will be seen at the following locations (identified by wavenumber ($cm^{-1}$)): 650–750, 900–1000, 1200–1325, 1380–1500, 1650–1800, 2500–3500.

When the target viscosity is reached, the starch is slowly added and the mixture is mixed and heated until the starch is uniformly dispersed, generally about 20 minutes. Preferably when the starch is fully dispersed the mixture has a dispersion measurement of 3 or better on a Hegman fineness of grind gauge. Preferably the viscosity is that of a paste similar to wet plaster or joint compound. Preferably after about 5 of the 20 minutes, the mixture will become suddenly much thicker and paste-like. When fully dispersed, preferably another IR scan is taken as described above except with toluene as the solvent, and preferably peaks will be seen at the following wavenumber locations: 700–780, 900–1000, 1200–1340, 1380–1475, 1650–1775, 2500–3500 with another peak at 2800–3000.

When the starch is fully dispersed, the carrier (preferably preheated to 335°–360° F.), is then slowly added and the batch is mixed for about 2 hours, preferably until the mixture meets the following preferred parameters (if the carrier is asphalt): ring and ball softening point of 87°–97° C. (189°–207° F.), density of 1.03–1.15, preferably about 1.05, g/cm³, acid value of about 45–60, and weight loss of 0.5% maximum when heated for 2 hrs. at 105° C. When the batch is done, the mixture is preferably pelletized and treated with a partitioning agent such as talc to prevent sticking or massing.

The rubber additive of the present invention provides many advantages when added to a rubber compound, including improved mixing, extrusion, and processing characteristics, improved dispersion, improved filler incorporation, shorter mixing cycle with lower viscosity and less energy consumption, ease of handling, reduced amount of loose filler on highly loaded stocks, reduced dryness during manufacturing, less need for retarders, improved mill banding and handling, improved tear resistance and wire adhesion, increased stiffness, and reduced mold tearing, without deterioration of other vulcanizate properties.

The rubber additive is preferably added to rubber compounds comprising rubber selected from the group consisting of natural rubbers, synthetic rubbers, and mixtures thereof, the synthetic rubbers being preferably styrene-butadiene rubber, isobutylene-based rubbers such as butyl rubber, halobutyl rubber, and isobutylene-paramethylstyrene copolymer rubber, polychloroprene rubber, polybutadiene rubber, EPDM rubber, and nitrile rubber, less preferably the following rubbers: acrylic, chlorinated polyethylene (preferably using silica carrier), epichlorohydrin, ethylene/acrylic, EPM, isoprene-acrylonitrile, polyisobutylene, polyisoprene, polynorbornene, and styrene-isoprene. The rubber compounds find particular utility for tires, tire treads, carcasses, and sidewalls, coating stocks, hoses, belting, inner tubes, innerliners, general purpose rubbers, and other uses. The rubber compounds may include accelerators, retarders, activators, vulcanizers, antioxidants, antiozonants, plasticizers, processing aids, stabilizers, tackifiers, extenders, fillers, reinforcing materials, blowing agents, lubricants, polymerization materials, and other rubber compounding materials known in the art.

The rubber additive is preferably added to the rubber compound in an amount so that there are about 0.01–4, more preferably about 0.1–1.4, more preferably about 0.2–0.8, more preferably about 0.3–0.65, more preferably about 0.45, parts fatty acid per 100 parts rubber. The rubber additive is preferably added into the rubber compound by adding it along with the filler such as carbon black or immediately before the filler.

The following Examples further illustrate various aspects of the invention. Unless otherwise indicated, the ingredients are combined using methods known in the art or as described above.

EXAMPLE 13

A styrene butadiene rubber/polybutadiene rubber tread stock compound was prepared as a control and identified as Sample 13. The control consisted of 100 parts SBR 1608 (a styrene butadiene rubber being about 60 parts rubber and about 40 parts carbon black and other materials), 40 parts BR 1207 (a polybutadiene rubber), 4 parts zinc oxide (an activator), 2 parts stearic acid (an activator), 1 part Santoflex 13, which is N-(1,3-dimethylbutyl)-N'-phenyl-p-phenylene-diamine (an antiozonant), 20 parts N234 carbon black, 6 parts Sundex 790 aromatic oil available from R. E. Carroll (a plasticizer), 1.2 parts Santocure MOR, which is 2-(morpholinothio) benzothiazole (an accelerator), 1 part Flectol H, which is polymerized 1,2-dihydro-2,2,4-trimethylquinoline (an antioxidant), 0.3 parts 75% TMTM, which is a composition of 75 parts tetramethyl thiuram monosulfide and 25 parts ethylene propylene rubber (an accelerator), and 2.5 parts 80% RM Sulfur, which is 80 parts rubber makers sulfur and 20 parts ethylene propylene rubber (a vulcanizer). Sample 13 was prepared in accordance with techniques known in the art and was cured for 16 min. at 310° F. and had the following characteristics: 100% Modulus: 385 psi; 300% Modulus: 1495 psi; elongation at break: 380%; tensile strength: 2000 psi; Die C Tear Strength (all such tear testing being according to ASTM D624): 208 psi.

Sample 13A was prepared, which was Sample 13 to which was added 6 parts (ie, 6 parts per hundred parts rubber) of the invented rubber additive, which rubber additive was formulated of the following: 243 parts Industrene 226 soya fatty acid, 8.4 parts DI-CUP 40C organic peroxide, 3.6 parts SR350 coagent, 495 parts corn starch, 860 parts asphalt identified as A in Example 1 above, 1300 parts Flow-92 oxidized asphalt (blown) identified as H in Example 12 above, and 95 parts AT-1941 ethylene-vinyl acetate (referenced in Example 2 above). The rubber additive was prepared in accordance with the procedure set forth above, with the last three ingredients being melted and mixed before being added as the carrier. Sample 13A was cured and tested the same as Sample 13 and had the following characteristics: 100% Modulus: 380 psi; 300% Modulus: 1310 psi; elongation at break: 435%; tensile strength: 2130 psi; and Die C Tear Strength: 250 psi. The invented rubber additive increased the tear strength of the rubber compound. In Sample 13A, the invented rubber additive also improved the mold flow and decreased the amperage usage of the Brabender mixer.

EXAMPLE 14

The invented rubber additive of Example 13 was tested in a non-marking neoprene rubber compound. Samples 14 and 14A were prepared as follows.

|  | Sample 14 | Sample 14A |
|---|---|---|
| Neoprene W | 100 | 100 |
| MgO (an activator) | 4 | 4 |
| Flectol H | 2 | 2 |
| SBR 1848 (a colorant) | 3 | 3 |
| HC-75 Clay (filler) | 60 | 60 |
| Stearic acid | 1 | 1 |
| Sundex 790 | 30 | 30 |
| ZnO | 5 | 5 |
| Ethylene thiourea | 1 | 1 |
| Invented additive of Ex. 13 | 0 | 6 |

Samples 14 and 14A were cured for 12 min. at 320° F. and were measured as follows, with modulus and strength in these and the following Examples being measured in psi:

|  | 100% Modulus | 300% Modulus | Elongation at break | Tensile strength | Die C Tear strength |
|---|---|---|---|---|---|
| Sample 14 | 182 | 318 | 790% | 2090 | 139 |
| Sample 14A | 188 | 329 | 840% | 2260 | 157 |

Rheometer data (ASTM D2084) was also collected. The conditions were 12 min., 350° F., 3° arc, 50 range. The results were:

|  | Maximum Torque | Minimum Torque | TS(1) | TC(90) |
|---|---|---|---|---|
| Sample 14 | 34.45 | 2.69 | 2.08 | 10.45 |
| Sample 14A | 33.36 | 2.56 | 2.08 | 10.37 |

The invented additive improved processing and improved incorporation of the clay. The rheometer data shows very little difference in state of cure. There is a notable increase in elongation, tensile strength, and tear strength.

EXAMPLE 15 (Butyl rubber compound)

|  | Sample 15 | Sample 15A |
|---|---|---|
| Chlorobutyl 1068 (a chlorinated butyl rubber) | 100 | 100 |
| N660 carbon black | 50 | 50 |
| ZnO | 5 | 5 |
| Stearic acid | 1 | 1 |
| 80% RM Sulfur | 1 | 1 |
| MBTS | 3.5 | 3.5 |
| Invented additive of Ex. 13 | 0 | 5 |

MBTS is mercaptobenzothiazole disulfide. Samples 15 and 15A were cured for 5 min. at 350° F. and their Die C Tear Strengths were 215 and 255 psi, respectively. Rheometer data was also collected, the conditions being 12 min., 350° F., 3° arc, 50 range. Samples 15 and 15A measured TS(1) of 1.08 and 1.15, respectively, and TC(90) of 4.85 and 5.47, respectively.

EXAMPLE 16 (SBR rubber compound)

|  | Sample 16 | Sample 16A |
|---|---|---|
| SBR 1503 | 100 | 100 |
| N660 carbon black | 50 | 50 |
| ZnO | 5 | 5 |
| 80% RM Sulfur | 2 | 2 |
| 75% TMTD | 0.15 | 0.15 |
| 75% CBTS | 1 | 1 |
| Invented additive of Ex. 13 | 0 | 5 |

75% TMTD and 75% CBTS are 75 parts tetramethyl thiuram disulfide and 75 parts N-cyclohexyl-2-benzothiazole sulfenamide, respectively, with 25 parts ethylene propylene rubber. Samples 16 and 16A were cured for 7 and 8 min., respectively, at 350° F. and their Die C Tear Strengths were 207 and 266 psi, respectively. Rheometer data was also collected, the conditions being 12 min., 350° F. 3° arc, 50 range The results were as follows.

|  | Maximum Torque | Minimum Torque | TS(1) | TC(90) |
|---|---|---|---|---|
| Sample 16 | 72.29 | 11.33 | 1.73 | 5.82 |
| Sample 16A | 67.74 | 9.80 | 2.07 | 6.97 |

The rheometer data shows the invented additive increased scorch safety.

EXAMPLE 17

|  | Sample 17 | Sample 17A |
|---|---|---|
| SBR 4681 | 175 | 175 |
| N660 carbon black | 87.5 | 87.5 |
| ZnO | 8.75 | 8.75 |
| 80% RM Sulfur | 3.5 | 3.5 |
| 75% TMTD | 0.27 | 0.27 |
| 75% CBTS | 1.75 | 1.75 |
| Invented additive of Ex. 13 | 0 | 8.75 |

This SBR compound was tested using a rupture tear. The samples were cured for 30 min. at 350° F. in a mold cavity 6"×4"×½" (240 g sample). Four 1 inch strips were cut. Using a rupture tear cutting device, a ¼ inch tear surface and 1 inch tabs were made. The tear strength results were: Samples 17 and 17A, 92 and 140 psi, respectively.

EXAMPLE 18

|  | Sample 18 | 18A | 18B | 18C |
|---|---|---|---|---|
| 1. SBR 1503 | 100 | 100 | 100 | 100 |
| 2. N660 carbon black | 50 | 50 | 50 | 50 |
| 3. ZnO | 5 | 5 | 5 | 5 |
| 4. 80% RM Sulfur | 2 | 2 | 2 | 2 |
| 5. 75% TMTD | 0.15 | 0.15 | 0.15 | 0.15 |
| 6. 75% CBTS | 1 | 1 | 1 | 1 |
| 7. Industrene 226 | 0 | 0.08103 | 0.1621 | 0.4045 |
| 8. DI-CUP 40C | 0 | 0.0028 | 0.0056 | 0.014 |
| 9. SR350 | 0 | 0.0012 | 0.0024 | 0.006 |
| 10. Corn starch | 0 | 0.165 | 0.33 | 0.8235 |
| 11. Asphalt "A" in Ex. 1 | 0 | 2.2 | 2 | 1.431 |
| 12. Flow-92 | 0 | 2.4 | 2.35 | 2.163 |
| 13. AT-1941 EVA | 0 | 0.15 | 0.15 | 0.158 |

The invented rubber additive with carrier is ingredients 7–13, which had a ring and ball softening point of about 100° C., 98° C., and 90° C., for Samples 18A, 18B, and 18C, respectively. The samples were cured and tested as in Example 17. The samples showed rupture tear strength of 104, 113, 124, and 153 psi, for Samples 18, 18A, 18B, and 18C, respectively. These results show that, even at reduced concentrations, the invention notably increases tear strength.

EXAMPLE 19

|  | Sample 19 | Sample 19A |
|---|---|---|
| SMR CV60 | 100 | 100 |
| N550 carbon black | 35 | 35 |
| HC-75 Clay | 30 | 30 |
| Flectol H | 2 | 2 |
| Sunpar 150 | 2.5 | 2.5 |
| ZnO | 5 | 5 |
| Stearic acid | 2 | 2 |
| Sunolite 240 wax | 2 | 2 |
| 80% RM Sulfur | 4 | 4 |
| 75% CBTS | 2 | 2 |
| Invented additive of Ex. 13 | 0 | 5 |

SMR CV60 is a natural rubber, SMR meaning Standard Malaysian Rubber. Sunpar 150 is a paraffinic oil available from R. E. Carroll, used as a plasticizer. Sunolite 240 wax is a blend of petroleum waxes, (a antiozonant) available from Witco-Organics. Samples 19 and 19A were cured for 4 min. at 350° F. and they had elongation at break of 428 and 593%, tensile strength of 2200 and 2733 psi, and Die C Tear Strength of 180 and 209 psi, respectively, and Die C Tear Strength after heat aging of 100 hrs at 158° F. of 194 and 263 psi, respectively. Sample 19A had better incorporation of carbon black, notably better tensile and tear strength, and better tear strength after heat aging, than Sample 19.

EXAMPLE 20

|  | Sample 20 | 20A | 20B | 20C |
|---|---|---|---|---|
| 1. SBR 1503 | 100 | 100 | 100 | 100 |
| 2. N660 carbon black | 50 | 50 | 50 | 50 |
| 3. ZnO | 5 | 5 | 5 | 5 |
| 4. 80% RM Sulfur | 2 | 2 | 2 | 2 |
| 5. 75% TMTD | 0.15 | 0.15 | 0.15 | 0.15 |
| 6. 75% CBTS | 1 | 1 | 1 | 1 |
| 7. Industrene 226 | 0 | 0.4045 | 0.5672 | 0.729 |
| 8. DI-CUP 40C | 0 | 0.014 | 0.0196 | 0.025 |
| 9. SR350 | 0 | 0.006 | 0.0084 | 0.0108 |
| 10. Corn starch | 0 | 0.8235 | 1.155 | 1.485 |
| 11. Asphalt "A" in Ex. 1 | 0 | 1.431 | 0.75 | 0 |
| 12. Flow-92 | 0 | 2.163 | 2.35 | 2.6 |
| 13. AT-1941 EVA | 0 | 0.158 | 0.15 | 0.15 |

The invented rubber additive with carrier is ingredients 7–13, which had a ring and ball softening point of about 90° C., 101.5° C., and 95.5° C., for Samples 20A, 20B, and 20C, respectively. The samples were cured and tested as in Example 17, except the cure time was 25 min. The samples showed rupture tear strength of 114, 167, 157, and 151 psi, for Samples 20, 20A, 20B, and 20C, respectively. At increased concentrations, the invention increases tear strength.

EXAMPLE 21

|  | Sample 21 | 21A | 21B | 21C | 21D |
|---|---|---|---|---|---|
| 1. SBR 1503 | 100 | 100 | 100 | 100 | 100 |
| 2. N660 carbon black | 50 | 50 | 50 | 50 | 50 |
| 3. ZnO | 5 | 5 | 5 | 5 | 5 |
| 4. 80% RM Sulfur | 2 | 2 | 2 | 2 | 2 |
| 5. 75% TMTD | 0.15 | 0.15 | 0.15 | 0.15 | 0.15 |
| 6. 75% CBTS | 1 | 1 | 1 | 1 | 1 |
| 7. Industrene 226 | 0 | 0.6286 | 1.257 | 0 | 0.4854 |
| 8. DI-CUP 40C | 0 | 0.0214 | 0.0428 | 0 | 0.0168 |
| 9. SR350 | 0 | 0.0099 | 0.0198 | 0 | 0.0072 |
| 10. Corn starch | 0 | 1.34 | 2.68 | 0 | 0.9882 |
| 11. Asphalt "A" in Ex. 1 | 0 | 2.6 | 0 | 2.6 | 1.717 |
| 12. Flow-92 | 0 | 1.28 | 0 | 1.28 | 2.596 |
| 13. AT-1941 EVA | 0 | 0.12 | 0 | 0.12 | 0.1896 |

In Sample 21A, ingredients 7–10 were combined as previously described, but this combination was added separately from ingredients 11–13, which were also combined before being added. The samples were cured at 350° F. for 8 min., except that Sample 21 was cured for 7 min. Samples 21, 21A, 21B, 21C, and 21D had Tensile Strengths of 2220, 1620, 1790, 2007, and 1911 psi, respectively, and Die C Tear Strengths of 211, 251, 261, 238, and 272 psi, respectively. It can be seen that the rubber additive (ingred. 7–10) is very effective in increasing tear strength, even without a carrier, although it is preferable to be combined with and include a carrier (such as ingred. 11–13) before being added.

EXAMPLE 22

|  | Sample 22 | 22A | 22B |
|---|---|---|---|
| 1. Butyl 1068 | 100 | 100 | 100 |
| 2. N660 carbon black | 50 | 50 | 50 |
| 3. Stearic acid | 1 | 1 | 1 |
| 4. 80% RM Sulfur | 1 | 1 | 1 |
| 5. MTBS | 3.5 | 3.5 | 3.5 |
| 6. ZnO | 5 | 5 | 5 |
| 7. Industrene 226 | 0 | 1.257 | 0.4854 |
| 8. DI-CUP 40C | 0 | 0.0428 | 0.0168 |
| 9. SR350 | 0 | 0.0198 | 0.0072 |
| 10. Corn starch | 0 | 2.68 | 0.9882 |
| 11. Asphalt "A" in Ex. 1 | 0 | 0 | 1.717 |
| 12. Flow-92 | 0 | 0 | 2.596 |
| 13. AT-1941 EVA | 0 | 0 | 0.1896 |

The samples were cured for 5.5 min. at 350° F. Samples 22, 22A, and 22B had Die C Tear Strengths of 210, 238, and 254 psi, respectively. It can be seen that the rubber additive of 22A (ingred. 7–10) is effective in increasing tear strength, even without a carrier, although it is preferable to include a carrier before being added.

EXAMPLE 23

|  | Sample 23 | 23A | 23B |
|---|---|---|---|
| 1. SBR 1502 | 70 | 70 | 70 |
| 2. SMR CV60 | 30 | 30 | 30 |
| 3. N550 carbon black | 50 | 50 | 50 |
| 4. HC-75 Clay | 30 | 30 | 30 |
| 5. ZnO | 5 | 5 | 5 |
| 6. Flextol H | 1 | 1 | 1 |
| 7. Sundex 790 | 3 | 3 | 3 |
| 8. Stearic acid | 2 | 2 | 2 |
| 9. Sunolite 240 wax | 1 | 1 | 1 |
| 10. 80% RM Sulfur | 3 | 3 | 3 |
| 11. 75% CBTS | 1.5 | 1.5 | 1.5 |
| 12. 75% TMTM | 0.2 | 0.2 | 0.2 |
| 13. Industrene 226 | 0 | 1.143 | 0.4854 |
| 14. DI-CUP 40C | 0 | 0.039 | 0.0168 |
| 15. SR350 | 0 | 0.018 | 0.0072 |
| 16. Corn starch | 0 | 2.8 | 0.9882 |
| 17. Asphalt "A" in Ex. 1 | 0 | 0 | 1.717 |
| 18. Flow-92 | 0 | 0 | 2.596 |
| 19. AT-1941 EVA | 0 | 0 | 0.1896 |

The sample rubber compounds were cured for 5 min. at 350° F. Samples 23, 23A, and 23B had Die C Tear Strengths of 190, 252, and 267 psi, respectively. Rheometer data was collected, the conditions being 12 min., 350° F., 3° arc, 100 range. Samples 23, A, and 23B showed TS(1) of 1.77, 1.80, and 2.08 min., respectively, and TC(90) of 4.67, 4.78, and 4.90 min., respectively. The state of cure of Sample 23A was not depressed or retarded very much and still exhibited increased tear resistance.

EXAMPLE 24

|  | Sample 24 | 24A | 24B |
|---|---|---|---|
| 1. Chlorobutyl 1068 | 20 | 20 | 20 |
| 2. Royalene 521 (EPDM rubber) | 20 | 20 | 20 |
| 3. SMR CV60 | 40 | 40 | 40 |
| 4. SBR 1502 | 20 | 20 | 20 |
| 5. TiO$_2$ | 25 | 25 | 25 |
| 6. Ultra Blue colorant | 0.15 | 0.15 | 0.15 |
| 7. HC-75 Clay | 30 | 30 | 30 |
| 8. ZnO | 10 | 10 | 10 |
| 9. Stearic acid | 1 | 1 | 1 |

-continued

|  | Sample 24 | 24A | 24B |
| --- | --- | --- | --- |
| 10. Sunolite 240 wax | 1.5 | 1.5 | 1.5 |
| 11. Industrene 226 | 0 | 0.58 | 1.17 |
| 12. DI-CUP 40C | 0 | 0.02 | 0.04 |
| 13. SR350 | 0 | 0.0086 | 0.017 |
| 14. Corn starch | 0 | 1.19 | 2.376 |
| 15. Hi-Sil ABS | 0 | 0.2 | 0.4 |
| 16. Crystex Insol. Sulfur | 1 | 1 | 1 |
| 17. 75% TMTM | 0.20 | 0.20 | 0.20 |
| 18. 75% CBTS | 0.75 | 0.75 | 0.75 |

In this white sidewall rubber compound which was bright white, the invented additive (ingred. 11–15) improved mold flow. Samples 24, 24A, and 24B were cured for 25 min. at 350° F. and tested as in Example 17 and showed rupture tear strength of 113, 134, and 151 psi, respectively.

EXAMPLE 25

Sample 25 was the same formulation as Sample 16. Sample 25A was the same as Sample 25 except that the invented additive of Sample 24B (a free-flowing, dustless powder, which is advantageous) was added. Samples 25 and 25A were tested as in Example 24 and showed rupture tear strength of 126 and 175 psi, respectively. Also, in the basic formulation of Sample 25, the invented additive of Sample 25A, compared to the invented additive of Sample 16A, produced higher 300% modulus and higher tensile strength.

EXAMPLE 26

The invented additive of Sample 25A was tested, except that talc(6H) was used as the carrier instead of silica. This additive improved the tear strength of Sample 25.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A composition for use as a rubber additive, said composition being a mixture comprising crosslinked fatty acid and starch, said crosslinked fatty acid being formed from one or more fatty acids selected from the group consisting of saturated and unsaturated monocarboxylic acids.

2. A composition according to claim 1, further comprising a carrier, said carrier being capable of effectively carrying the composition into a rubber compound.

3. A composition according to claim 1, wherein said fatty acid is vegetable oil fatty acid.

4. A composition according to claim 2, wherein said carrier is selected from the group consisting of asphalt carriers and silica carriers.

5. A composition according to claim 2, wherein said fatty acid is soya fatty acid and said starch is corn starch.

6. A composition according to claim 5, said composition having about 1–3 parts by weight corn starch per 1 part by weight crosslinked fatty acid.

7. A composition according to claim 6, said composition having about 6–12 parts by weight asphalt carrier per 1 part by weight crosslinked fatty acid.

8. A composition according to claim 6, said composition having about 2 parts by weight corn starch per 1 part by weight crosslinked fatty acid, said composition being at least 50 weight percent asphalt carrier, and said asphalt carrier including an amount of resin effective to make the composition pelletizable.

9. A composition according to claim 2, wherein said composition is white.

10. A composition according to claim 1, said fatty acid being crosslinked by means of a peroxide having a 1 hour half life temperature between 240° F. and 300° F.

11. A rubber compound comprising a) rubber selected from the group consisting of natural rubbers, synthetic rubbers, and mixtures of any of the foregoing and b) a rubber additive, said rubber additive comprising crosslinked fatty acid and starch, said rubber additive being present in said rubber compound in an amount effective to increase the tear resistance of said rubber compound.

12. A rubber compound according to claim 11, wherein said synthetic rubbers are selected from the group consisting of styrene-butadiene rubber, butyl rubber, halobutyl rubber, isobutylene-paramethylstyrene copolymer rubber, polychloroprene rubber, polybutadiene rubber, EPDM rubber, and nitrile rubber.

13. A rubber compound according to claim 11, wherein said rubber additive further comprises a carrier to carry the rubber additive into the rubber compound.

14. A rubber compound according to claim 13, said rubber compound having about 0.01–4 parts by weight crosslinked fatty acid per 100 parts by weight rubber.

15. A rubber compound according to claim 13, wherein said carrier is selected from the group consisting of asphalt carriers and silica carriers.

16. A rubber compound according to claim 13, wherein said fatty acid is soya fatty acid and said starch is corn starch.

17. A rubber compound according to claim 16, said rubber additive having about 1–3 parts by weight corn starch per 1 part by weight crosslinked fatty acid.

18. A rubber compound according to claim 17, said rubber additive having about 2 parts by weight corn starch per 1 part by weight crosslinked fatty acid, said rubber additive being at least 50 weight percent asphalt carrier, and said asphalt carrier including an amount of resin effective to make the rubber additive pelletizable.

19. A composition according to claim 2, said composition having not more than 3 parts by weight corn starch per 1 part by weight crosslinked fatty acid.

20. A composition according to claim 6, said composition having about 2 parts by weight corn starch per 1 part by weight crosslinked fatty acid.

* * * * *